United States Patent
Oetken et al.

(10) Patent No.: US 11,072,892 B2
(45) Date of Patent: Jul. 27, 2021

(54) COMPACTOR WITH INTERNAL DOUBLE HELICAL SPLINED SHAFT

(71) Applicant: Caterpillar Paving Products Inc., Brooklyn Park, MN (US)

(72) Inventors: Nicholas A. Oetken, Brooklyn Park, MN (US); Todd A. Impola, Minnetonka, MN (US); Eric A. Hansen, Big Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 92 days.

(21) Appl. No.: 16/662,476

(22) Filed: Oct. 24, 2019

(65) Prior Publication Data

US 2021/0123194 A1 Apr. 29, 2021

(51) Int. Cl.
| | |
|---|---|
| *E01C 19/28* | (2006.01) |
| *F16D 3/06* | (2006.01) |
| *H02K 7/06* | (2006.01) |
| *H02K 7/00* | (2006.01) |

(52) U.S. Cl.
CPC .......... *E01C 19/286* (2013.01); *E01C 19/282* (2013.01); *F16D 3/06* (2013.01); *H02K 7/003* (2013.01); *H02K 7/063* (2013.01)

(58) Field of Classification Search
CPC ........ E01C 19/282; E01C 19/286; F16D 3/06; H02K 7/003; H02K 7/063
USPC ....................................................... 404/117
See application file for complete search history.

(56) References Cited

U.S. PATENT DOCUMENTS

| | | | | |
|---|---|---|---|---|
| RE25,861 E | * | 9/1965 | Green .................... | E01C 19/286 |
| | | | | 404/133.05 |
| 4,454,780 A | * | 6/1984 | Goehler ................ | E01C 19/286 |
| | | | | 74/87 |
| 4,568,218 A | * | 2/1986 | Orzal ...................... | B06B 1/161 |
| | | | | 404/117 |
| 6,752,560 B2 | | 6/2004 | Wilson et al. | |
| 8,393,826 B1 | * | 3/2013 | Marsolek .............. | E01C 19/286 |
| | | | | 404/117 |
| 8,876,500 B2 | | 11/2014 | Brown et al. | |
| 9,103,077 B2 | | 8/2015 | Oetken | |

(Continued)

FOREIGN PATENT DOCUMENTS

| | | |
|---|---|---|
| CN | 201401446 | 2/2010 |
| CN | 203023318 | 6/2013 |

*Primary Examiner* — Raymond W Addie
(74) *Attorney, Agent, or Firm* — Schwegman, Lundberg & Woessner

(57) ABSTRACT

A vibratory system for a compactor machine, the vibratory system optionally including a key shaft, an input shaft, a first output shaft and a second output shaft. The key shaft can have a first internal helically splined portion and a second internal helically splined portion. The first internal helically splined portion can be oppositely splined with respect to the second internal helically splined portion and arranged axially of the second internal helically splined portion. The input shaft can be configured with an external helically splined portion configured to be complimentary to the first internal helically splined portion of the key shaft. The first output shaft can be configured couple to the input shaft for rotation therewith. The second output shaft can have an external helically splined portion configured to be complimentary to the second internal helically splined portion of the key shaft.

17 Claims, 5 Drawing Sheets

(56) References Cited

U.S. PATENT DOCUMENTS 10,145,188 B2 12/2018 Smith et al.
2009/0215543 A1 8/2009 Brissette

* cited by examiner

COMPACTOR WITH INTERNAL DOUBLE HELICAL SPLINED SHAFT

TECHNICAL FIELD

This disclosure relates to vibratory compaction equipment, and more specifically to a vibratory system/mechanism having an internal double helical splined shaft.

BACKGROUND

Compactors (also called compaction or compactor machines) are machines used to compact initially loose materials, such as asphalt, soil, gravel, and the like, to a densified and more rigid mass or surface. For example, during construction of roadways, highways, parking lots and the like, loose asphalt is deposited and spread over the surface to be paved. Compactors are also utilized to compact soil or recently laid concrete at construction sites and on landscaping projects to produce a densified, rigid foundation on which other structures may be built. Most compactors include a rotatable roller drum that may be rolled over the surface to compress the material underneath. In addition to utilizing the weight of the roller drum to provide the compressive forces that compact the material, some compactors are configured to also induce a vibratory force to the surface.

The splined connection of shafts are known in industrial equipment, for example U.S. Pat. No. 9,103,077 discloses a splined shaft connection.

SUMMARY

In an example according to this disclosure, a vibratory system for a compactor machine is disclosed. The vibratory system can optionally comprise: an outer eccentric, an inner eccentric, a motor, a key shaft, an input shaft, a first output shaft and a second output shaft. The key shaft can optionally have a first internal helically splined portion and a second internal helically splined portion. The first internal helically splined portion can be oppositely splined with respect to the second internal helically splined portion and can be arranged axially of the second internal helically splined portion. The input shaft can be configured to couple with the motor. The input shaft can have an external helically splined portion configured to be complimentary to and positioned at least partially within the first internal helically splined portion of the key shaft. The first output shaft can be configured to be positioned within and configured to couple to the input shaft for rotation therewith. The first output shaft can be configured to couple with one of the inner eccentric or the outer eccentric. The second output shaft can be configured to couple with the other one of the inner eccentric or the outer eccentric. The second output shaft can have an external helically splined portion configured to be complimentary to and positioned at least partially within the second internal helically splined portion of the key shaft.

In another example, a compactor machine is disclosed and can comprise: a machine frame, at least one cylindrical roller drum and a vibratory system. The roller drum can be rotatably coupled to the machine frame and rotatable about a drum axis oriented generally transverse to a direction of travel of the compactor machine. The vibratory system can be associated with the roller drum, the vibratory system can optionally comprise: an outer eccentric, an inner eccentric arranged within the outer eccentric, a motor, a key shaft, an input shaft, a first output shaft and a second output shaft. The key shaft can have a first internal helically splined portion and a second internal helically splined portion. The first internal helically splined portion can be oppositely splined with respect to the second internal helically splined portion and arranged axially of the second internal helically splined portion. The input shaft can be coupled with the motor. The input shaft can have an external helically splined portion complimentary to and coupled with the first internal helically splined portion of the key shaft. The first output shaft can be positioned within and coupled to the input shaft for rotation therewith. The first output shaft can be coupled with one of the inner eccentric or the outer eccentric. The second output shaft can be configured to couple with the other one of the inner eccentric or the outer eccentric. The second output shaft can have an external helically splined portion complimentary to and coupled with the second internal helically splined portion of the key shaft.

In another example, a method of operating a vibratory system of a compactor machine is disclosed. The method can optionally comprise any one or any combination of: providing an outer eccentric within a roller drum of the compactor machine; providing an inner eccentric within the outer eccentric; rotating the outer eccentric and the inner eccentric; and operating a linear actuator to provide selective linear movement to a key shaft and selective rotational movement to an output shaft via a connection between an external helically splined portion of the second output shaft and an internal helically splined portion of the key shaft. The output shaft can be coupled to the outer eccentric, whereby, selective linear movement by the linear actuator of the key shaft and rotational movement of the output shaft rotatably offsets a weighted portion of the outer eccentric relative to a weighted portion of the inner eccentric.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
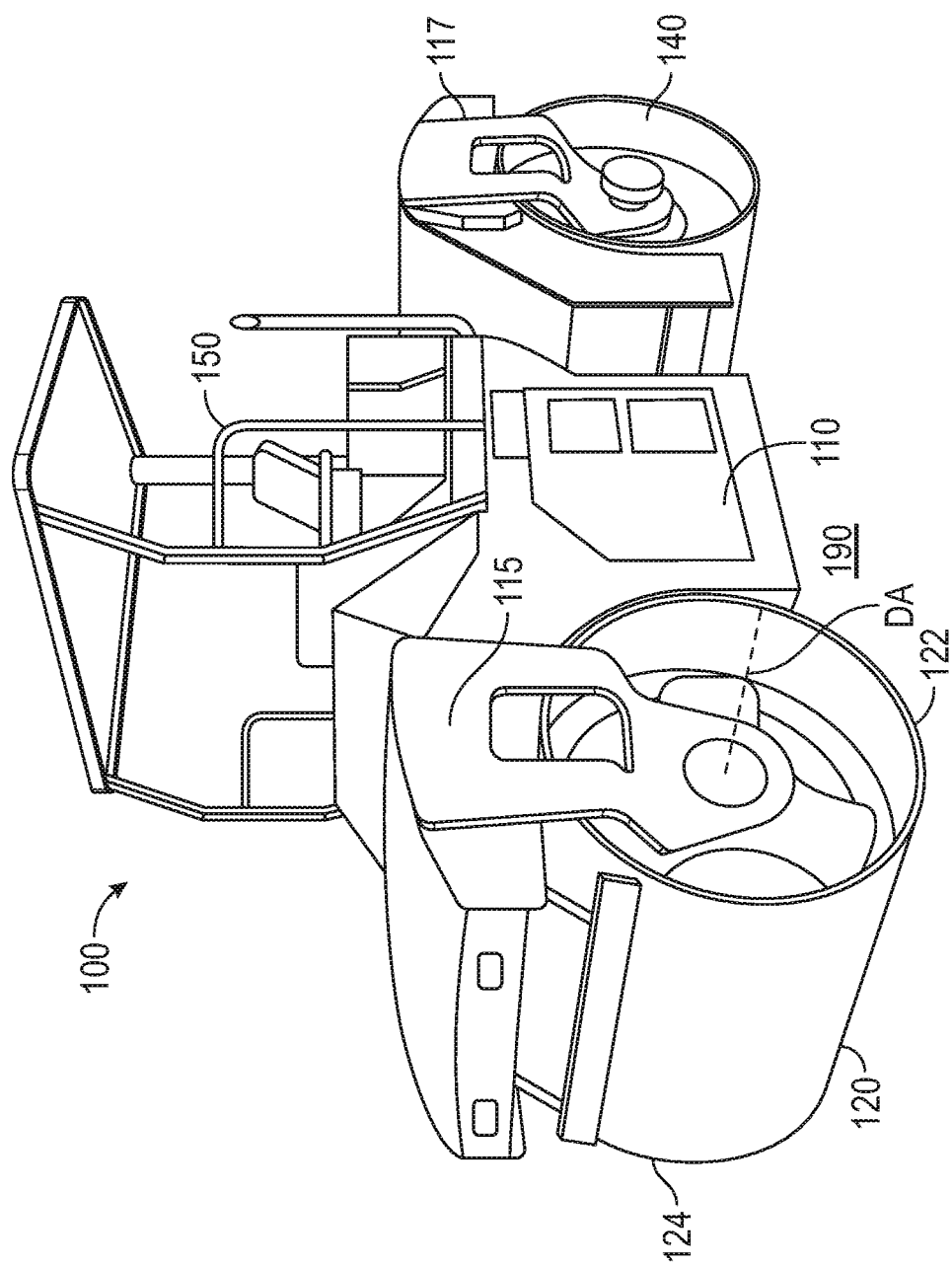
FIG. 1 shows a perspective view of a compactor machine, in accordance with one embodiment.

FIG. 1 shows a perspective view of a compactor machine 100, in accordance with one embodiment. Compactor machine 100 can be of the self-propelled type that can travel over a surface 190 under its own power. The compactor machine 100 generally includes a body or machine frame 110 that connects and associates the various physical and structural features that enable the compactor machine 100 to function. These features can include an operator's cab 150 that is mounted on top of the machine frame 110 from which an operator may control and direct operation of the compactor machine 100. Accordingly, a steering feature and similar controls may be located within the operator's cab 150. To propel the compactor machine 100 over the surface 190, a power system such as an internal combustion engine can also be mounted to the machine frame 110 and can generate power that is converted to physically move the machine.

Compactor machine 100 can include at least a cylindrical roller drum 120 which is rotatable about a drum axis oriented generally transverse to a direction of travel of the compactor machine 100. The cylindrical roller drum 120 includes a first end 122 and an opposite second end 124, with the drum axis DA extending between the first and second ends 122, 124. In the disclosed embodiment, compactor machine 100 also includes a second cylindrical roller drum 140 coupled to the machine frame 110. The roller drums 120, 140 are attached to the machine frame 110 using respective drum supports 115, 117. Roller drums 120, 140 are in rolling contact with the surface 190.

The compactor machine uses the roller drums 120, 140 to perform double drum vibratory compaction for compacting and/or increasing the density of a compactable material of surface 190, such as, soil, gravel, and bituminous mixtures to form a mat. Although the compactor machine 100 is shown as being a double drum machine, in at least some embodiments, the compactor machine may be a single drum machine, split drum machine or may employ other configurations known in the art (e.g., can have more than two drums).

Figure 2A:
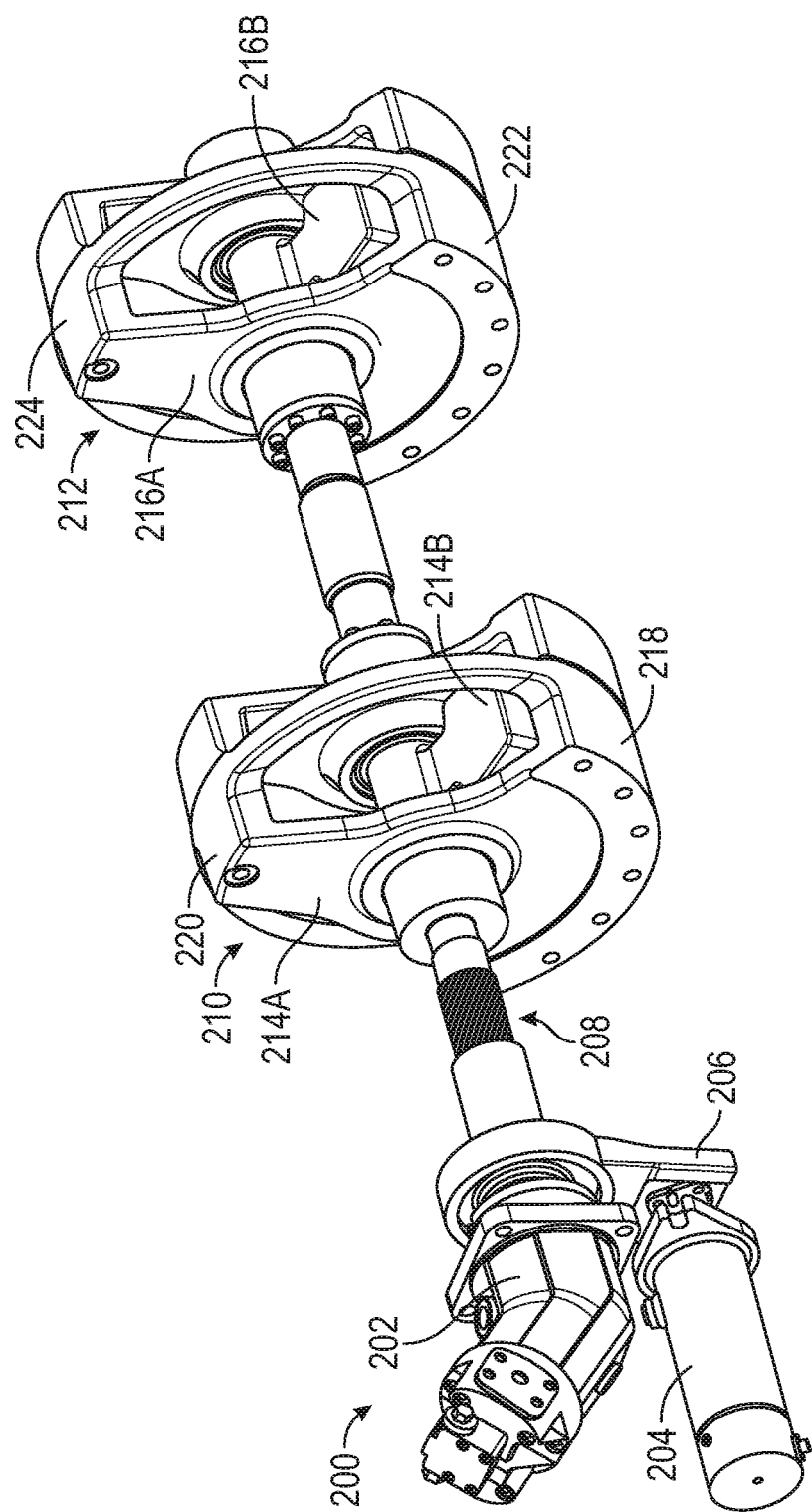
FIG. 2A is a perspective view of a vibratory system employed in a drum of the compactor machine of FIG. 1, in accordance with one embodiment.
Figure 2B:
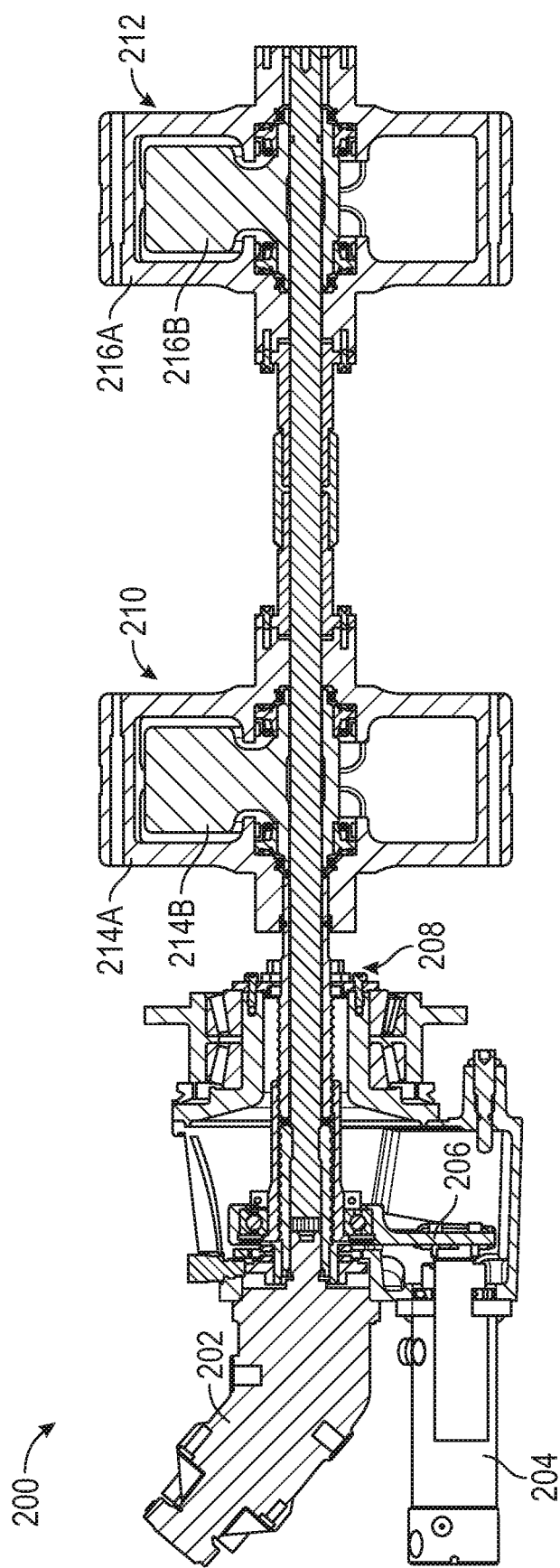
FIG. 2B is a cross-sectional view of the vibratory system of FIG. 2A, in accordance with one embodiment.

FIGS. 2A and 2B show a vibratory system 200 of the drum 120. The vibratory system 200 can include a motor 202, a linear actuator 204, a shift fork 206, a plurality of shafts 208, a first eccentric 210 and a second eccentric 212. The first eccentric 210 can include an outer eccentric portion 214A and an inner eccentric portion 214B. The second eccentric can include an outer eccentric portion 216A and an inner eccentric portion 216B.

The vibratory system 200 can be arranged axially within the drum 120 (FIG. 1) generally along the drum axis DA. The vibratory system 200 can be supported within the drum by supports that are not specifically shown in FIGS. 2A and 2B. The motor 202 can be coupled to the plurality shafts 208 by spline or other mechanical connection. The linear actuator 204 can be positioned adjacent the motor 202 and can be coupled to one of the plurality of shafts 208 via the shift fork 206. The plurality of shafts 208 can be coupled to the first eccentric 210 and the second eccentric 212. The outer eccentric portion 214A can have an internal space within which the inner eccentric portion 214B is configured to be positioned. Similarly, the outer eccentric portion 216A can have an internal space within which the inner eccentric portion 216B is configured to be positioned.

The first eccentric 210 and the second eccentric 212 are configured with eccentrically weighted shapes to induce vibrations on the drum for compacting material. In particular, both the outer eccentric portion 214A and the outer eccentric portion 216A have a portion 218 that is weighted relative to a portion 220 as shown in FIG. 2A. Similarly, both the inner eccentric portion 214B and the inner eccentric portion 216B have a similar construction with a portion 222 weighted relative to a portion 224. When the portions 218, 220, 222 and 224 are rotated, this offset in weight due to the configuration induces vibrations that are transferred to the drum.

In the example of FIGS. 2A and 2B, the motor 202 comprises a hydraulic motor configured to rotatably drive the plurality of shafts 208, and hence rotatably drive the first eccentric 210 and the second eccentric 212 including the portions 218, 220, 222 and 224. In brief and as will be discussed in further detail with respect to FIGS. 3A and 3B, the linear actuator 204 can comprise a hydraulic actuator that linearly moves a first one of the plurality of shafts 208 axially, thereby rotating a second one of the plurality of shafts 208. Rotation of this second one of the plurality of shafts 208 rotates the outer eccentric portion 214A and the outer eccentric portion 216A relative to the inner eccentric portion 214B and the inner eccentric portion 216B, respectively. This rotation clocks the weighted portions 218 of the outer eccentric portion 214A and the outer eccentric portion 216A so they are offset or clocked relative to the weighted portion 222 of the inner eccentric portion 214B and the inner eccentric portion 216B. By adjusting the offset between the weighted portions 218 and 222, the degree of vibration generated can be adjusted. As shown in FIGS. 2A and 2B, the weighted portions 218 and 222, are substantially aligned (i.e. un-clocked or un-offset) such that a maximum degree of vibration would be achieved in this arrangement.

Figure 3A:
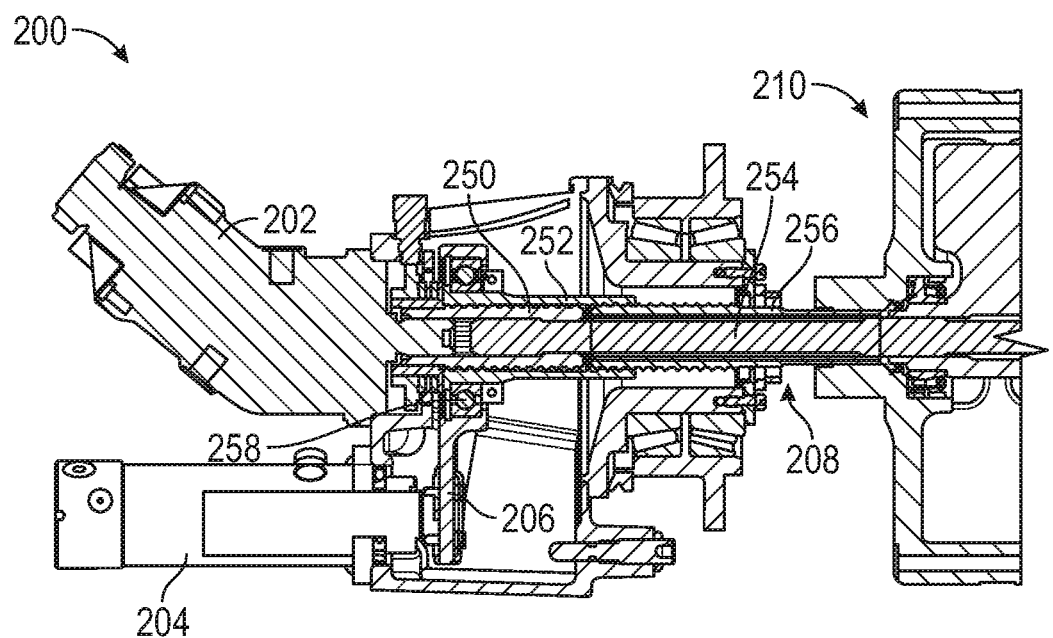
FIG. 3A is an enlarged cross-sectional view of a portion of the vibratory system of FIG. 2B, in accordance with one embodiment.
Figure 3B:
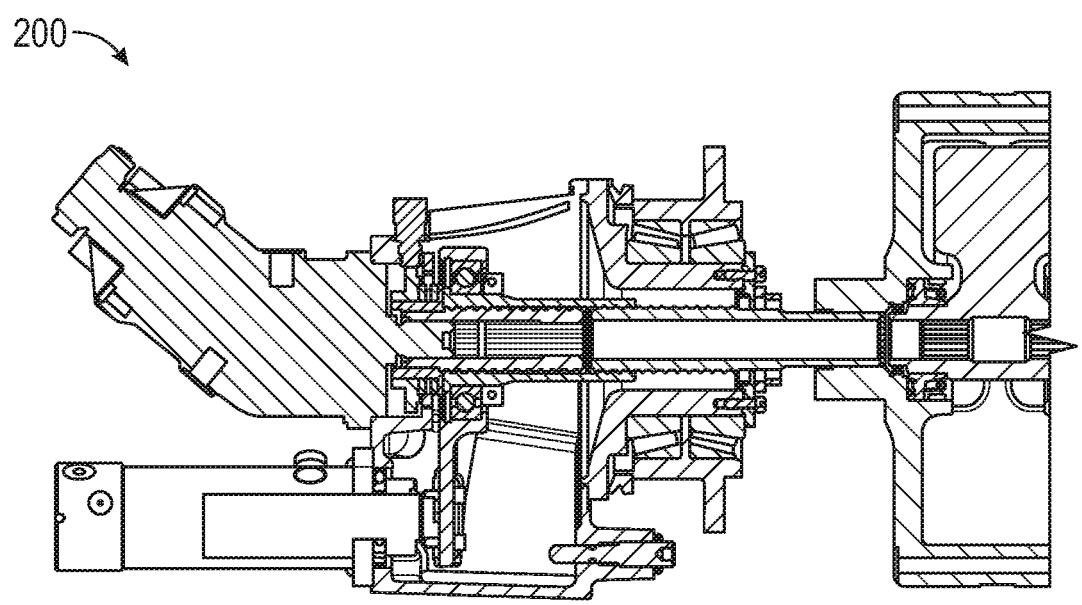
FIG. 3B is an enlarged cross-sectional view of the portion of the vibratory system of FIG. 3A with an inner shaft removed, in accordance with one embodiment.

FIG. 3A is an enlargement of the cross-section of FIG. 2B. FIG. 3B is the cross-section of FIG. 3A but with an inner most shaft (discussed subsequently) removed.

As shown in FIG. 3A, the vibratory system 200 can include the motor 202, the linear actuator 204, the shift fork 206, the plurality of shafts 208 and the first eccentric 210 as previously discussed. As further illustrated in FIG. 3A, the plurality of shafts 208 can comprise an input shaft 250, a key shaft 252, a first output shaft 254 and a second output shaft 256. Additionally, the vibratory system 200 can include a thrust bearing 258.

In the example of FIG. 3A, the motor 202 can be coupled to the input shaft 250 by a linear spline or other mechanical torque facilitating connection. Thus, the input shaft 250 can be coupled to the motor 202. The input shaft 250 can be positioned within and can be coupled internally to the key shaft 252. The linear actuator 204 can be coupled on an outer side to the key shaft 252 by connection through the shift fork 206 and the thrust bearing 258. The first output shaft 254 can be at least partially positioned (i.e. inserted) in the input shaft 250 and the second output shaft 256. The first output shaft 254 can couple with the input shaft 250 via a linear spline or other mechanical torque facilitating connection as shown in FIG. 3B. The first output shaft 254 can couple with the inner eccentric 214B via a linear spline or other mechanical torque facilitating connection as shown in FIG. 3B. The second output shaft 256 can be connected to the key shaft 252 and can be at least partially positioned (i.e. inserted) in the key shaft 252. The second output shaft 256 can couple with the outer eccentric 214A via a linear spline or other mechanical torque facilitating connection as shown in FIG. 3B. The second output shaft 256 can be configured to receive at least a portion of the first output shaft 254. Thus, in the arrangement of the example of FIG. 3A, the first output shaft 254 comprises an inner most shaft of the vibratory system 200 and can be at least partially disposed within the second output shaft 256, the input shaft 250 and the key shaft 252.

In particular, the input shaft 250 can have an external helically splined portion 260 (numbered in FIG. 4) configured to be complimentary to and couple with a first internal helically splined portion 262 (numbered in FIG. 4) of the key shaft 252. The second output shaft 256 can have an external helically splined portion 264 (numbered in FIG. 4) configured to be complimentary to and couple with a second internal helically splined portion 266 (numbered in FIG. 4) of the key shaft 252.

In the example of FIG. 3A, a least a portion of the motor 202 can be aligned with a rotational axis of the plurality of shafts 208, and in particular, the input shaft 250. The linear actuator 204 can be positioned adjacent to the motor 202 (e.g., on a same side of the plurality of shafts 208 from the first eccentric 210 and the second eccentric 212) but is offset from the rotational axis of the plurality of shafts 208 including the input shaft 250.

As discussed in previously, the motor 202 can be configured to rotatable drive the inner eccentric (here only 214B is shown) via the input shaft 250 and the first output shaft 254. The motor 202 can be configured to rotatably drive the outer eccentric (here only 214A is shown) via the key shaft 252 and the second output shaft 256. The linear actuator 204 can be coupled to the key shaft 252 via the shift fork 206 and the thrust bearing 258 and can provide for linear movement of the key shaft 252 along the rotational axis of the plurality of shafts 208. More particularly, the linear actuator 204 can be configured to provide selective linear movement to the key shaft 252 and can provide selective rotational movement of the second output shaft 256 via connection between the external helically splined portion 264 of the second output shaft 256 and the second internal helically splined portion 266 of the key shaft 252. The second output shaft 256 can be coupled to the outer eccentric 214A as previously discussed. Thus, selective linear movement by the linear actuator 204 of the key shaft 252 and rotational movement of the second output shaft 256 rotatably offsets the weighted portion 218 of the outer eccentric 214A relative to the weighted portion 222 of the inner eccentric 214B. This rotational movement of the second output shaft 256 can be in a direction opposite to the direction or rotation supplied by the motor 202.

Figure 4:
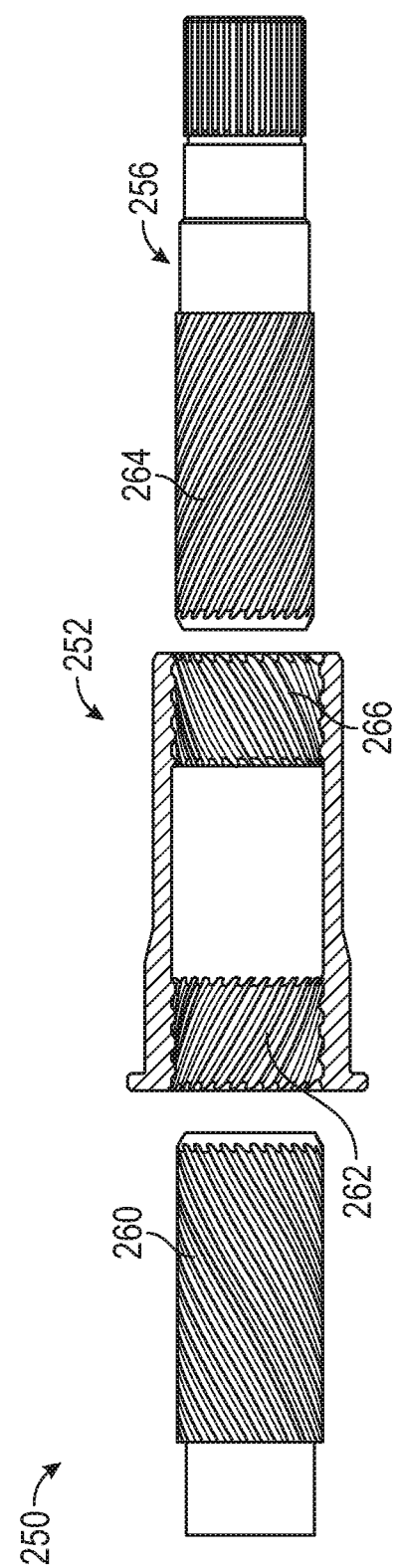
FIG. 4 shows plan view and a cross-sectional view of portions of the vibratory system of FIGS. 2A-3B comprising an input shaft, key shaft and an output shaft, in accordance with one embodiment.

FIG. 4 shows an exploded view of input shaft 250, the key shaft 252 and the second output shaft 256 with the key shaft 252 shown in cross-section. As previously discussed, the input shaft 250 can have the external helically splined portion 260 configured to be complimentary to and at least partially received in the first internal helically splined portion 262 of the key shaft 252. The second output shaft 256 can have the external helically splined portion 264 configured to be complimentary to and couple with the second internal helically splined portion 266 of the key shaft 252. It should be noted that the first internal helically splined portion 262 of the key shaft 252 is axially spaced from and is splined with a helix in the opposite direction from the second internal helically splined portion 266. As shown in FIG. 4, the first internal helically splined portion 262 has substantially a same pitch as the second internal helically splined portion 266. However, it is contemplated in other examples that the pitches of the first internal helically splined portion 262 relative to the second internal helically splined portion 266 can be dissimilar.

INDUSTRIAL APPLICABILITY

The present vibratory system 200 is applicable to many compactor machines.

For example, the disclosed vibratory system 200 can provide phase shifts (also called offset or clocking herein) of the outer eccentric 214A, 216A v. inner eccentric 214B, 216B associated with a change in an amount of vibration generated by the system 200 transferred to the rotary drum 120 of the compactor machine 100.

In further example, the line of light 202 can extend a distance in front of the roller drum to indicate a trajectory of the roller drum 120.

The disclosed vibratory system 200 can assist in alleviating space constraints within the roller drum 120. This is because the linear actuator 204 need not be placed on an opposing end of the plurality of shafts 208 from the motor 202 or otherwise aligned with the axis of rotation of the plurality of shafts 208 as had previously been assumed. Rather, the linear actuator 204 can be offset from the axis of rotation of the plurality of shafts 208 and the linear actuator 204 can be placed adjacent the motor 202, for example. As a result, the example disclosed herein may be better suited for use in smaller machines as it is better suited to space constraints.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A vibratory system for a compactor machine, the vibratory system comprising:
    an outer eccentric;
    an inner eccentric;
    a motor;
    a key shaft having a first internal helically splined portion and a second internal helically splined portion, the first internal helically splined portion oppositely splined with respect to the second internal helically splined portion and arranged axially of the second internal helically splined portion;
    an input shaft configured to couple with the motor, wherein the input shaft has an external helically splined portion configured to be complimentary to and positioned at least partially within the first internal helically splined portion of the key shaft;
    a first output shaft configured to be positioned within and configured to couple to the input shaft for rotation therewith, wherein the first output shaft is configured to couple with one of the inner eccentric or the outer eccentric;
    a second output shaft configured to couple with the other one of the inner eccentric or the outer eccentric, wherein the second output shaft has an external helically splined portion configured to be complimentary to and positioned at least partially within the second internal helically splined portion of the key shaft.

2. The system of claim 1, wherein the motor is configured to rotatably drive the inner eccentric via the input shaft and the first output shaft, and wherein the motor is configured to drive the outer eccentric via the key shaft and the second output shaft.

3. The system of claim 1, wherein the first output shaft comprises an inner most shaft of the vibratory system and is at least partially disposed within the second output shaft, the input shaft and the key shaft.

4. The system of claim 1, further comprising a linear actuator configured to couple with the key shaft to provide linear movement of the key shaft.

5. The system of claim 4, further comprising a shift fork configured to couple with the linear actuator and a thrust bearing configured to couple with the shift fork and the key shaft, wherein the linear actuator is coupled to the key shaft by connection through the shift fork and the thrust bearing.

6. The system of claim 4, wherein the linear actuator is configured to provide selective linear movement to the key shaft and selective rotational movement of the second output shaft via connection between the external helically splined portion of the second output shaft and the second internal helically splined portion of the key shaft, and wherein the second output shaft is coupled to the outer eccentric, whereby selective linear movement by the linear actuator of the key shaft and rotational movement of the second output shaft rotatably offsets a weighted portion of the outer eccentric relative to a weighted portion of the inner eccentric.

7. The system of claim 4, wherein at least a portion of the motor is aligned with a rotational axis of the input shaft, and wherein the linear actuator is positioned adjacent to the motor but is offset from the rotational axis of the input shaft.

8. A compactor machine comprising:
a machine frame;
at least one cylindrical roller drum rotatably coupled to the machine frame and rotatable about a drum axis oriented generally transverse to a direction of travel of the compactor machine; and
a vibratory system associated with the roller drum, the vibratory system comprising:
an outer eccentric;
an inner eccentric arranged within the outer eccentric;
a motor;
a key shaft having a first internal helically splined portion and a second internal helically splined portion, the first internal helically splined portion oppositely splined with respect to the second internal helically splined portion and arranged axially of the second internal helically splined portion;
an input shaft coupled with the motor, wherein the input shaft has an external helically splined portion complimentary to and coupled with the first internal helically splined portion of the key shaft;
a first output shaft positioned within and coupled to the input shaft for rotation therewith, wherein the first output shaft is coupled with one of the inner eccentric or the outer eccentric;
a second output shaft configured to couple with the other one of the inner eccentric or the outer eccentric, wherein the second output shaft has an external helically splined portion complimentary to and coupled with the second internal helically splined portion of the key shaft.

9. The compactor machine of claim 8, the motor rotatably drives the inner eccentric via the input shaft and the first output shaft and drives the outer eccentric via the key shaft and the second output shaft.

10. The compactor machine of claim 8, further comprising a linear actuator coupled with the key shaft to provide linear movement of the key shaft.

11. The compactor machine of claim 10, further comprising:
a shift fork coupled to the linear actuator;
a thrust bearing coupled to the shift fork and the key shaft.

12. The compactor machine of claim 10, wherein the linear actuator is configured to provide selective linear movement to the key shaft and selective rotational movement of the second output shaft via connection between the external helically splined portion of the second output shaft and the second internal helically splined portion of the key shaft, and wherein the second output shaft is coupled to the outer eccentric, whereby selective linear movement by the linear actuator of the key shaft and rotational movement of the second output shaft rotatably offsets a weighted portion of the outer eccentric relative to a weight portion of the inner eccentric.

13. The compactor machine of claim 10, wherein at least a portion of the motor is aligned with a rotational axis of the input shaft, and wherein the linear actuator is positioned adjacent to the motor but is offset from the rotational axis of the input shaft.

14. A method of operating a vibratory system of a compactor machine, the method comprising:
providing an outer eccentric within a roller drum of the compactor machine;
providing an inner eccentric within the outer eccentric;
rotating the outer eccentric and the inner eccentric; and
operating a linear actuator to provide selective linear movement to a key shaft and selective rotational movement to an output shaft via a connection between an external helically splined portion of the output shaft and an internal helically splined portion of the key shaft, and wherein the output shaft is coupled to the outer eccentric, whereby selective linear movement by the linear actuator of the key shaft and rotational movement of the output shaft rotatably offsets a weighted portion of the outer eccentric relative to a weighted portion of the inner eccentric.

15. The method of claim 14, wherein the key shaft is provided with the internal helically splined portion and a second internal helically splined portion, the internal helically splined portion oppositely splined with respect to the second internal helically splined portion and arranged axially of the second internal helically splined portion.

16. The method of claim 15, wherein rotating the outer eccentric and the inner eccentric comprises:
coupling an input shaft having an external helically splined portion to the second internal helically splined portion of the key shaft;
coupling a second output shaft to the input shaft and to the inner eccentric; and
operating a motor to provide rotation to the input shaft, the key shaft, the output shaft and the second output shaft.

17. The method of claim 14, wherein the linear actuator is positioned adjacent to a motor rotating the outer eccentric and the inner eccentric, and wherein the linear actuator and motor are positioned adjacent end portions of the key shaft and output shaft opposite from a second end portion adjacent the outer eccentric and the inner eccentric.

* * * * *